(12) United States Patent
Lin

(10) Patent No.: US 6,368,543 B1
(45) Date of Patent: Apr. 9, 2002

(54) PROCESS USING SINGLE SCREW EXTRUDER FOR PRODUCING A THREE LAYER CO-EXTRUSION BIAXIALLY ORIENTED POLYPROPYLENE SYNTHETIC PAPER OF THICKNESS 25~250 μM

(75) Inventor: Allen Fong-Chin Lin, Taipei (TW)

(73) Assignee: Nan Ya Plastics Corporation, Taipei (TW)

( * ) Notice: Subject to any disclaimer, the term of this patent is extended or adjusted under 35 U.S.C. 154(b) by 0 days.

(21) Appl. No.: 09/394,915

(22) Filed: Sep. 13, 1999

(51) Int. Cl.[7] .......................... B29C 47/06; B29C 35/10
(52) U.S. Cl. .................. 264/414; 264/415; 264/423; 264/469; 264/45.9; 264/173.14; 264/173.15; 264/288.8
(58) Field of Search ................................. 264/414, 211, 264/415, 288.8, 423, 290.2, 469, 45.9, 46.1, 173.14, 173.15

(56) References Cited

U.S. PATENT DOCUMENTS

| | | | |
|---|---|---|---|
| 3,773,608 A | * | 11/1973 | Yoshimura et al. |
| 3,894,904 A | * | 7/1975 | Cook |
| 4,522,887 A | * | 6/1985 | Koebisu et al. |
| 4,705,813 A | * | 11/1987 | Ito et al. |
| 5,209,884 A | * | 5/1993 | Wood et al. |
| 5,401,562 A | * | 3/1995 | Akao |
| 5,552,011 A | * | 9/1996 | Lin |
| 5,700,564 A | * | 12/1997 | Freedman |
| 5,861,201 A | * | 1/1999 | Blackwelder et al. |
| 6,001,290 A | * | 12/1999 | Lin |
| 6,087,079 A | * | 7/2000 | Newbuerry et al. |
| 6,096,684 A | * | 8/2000 | Sasaki et al. |

* cited by examiner

Primary Examiner—Mark Eashoo
(74) Attorney, Agent, or Firm—Bacon & Thomas

(57) ABSTRACT

Disclosed is an improvement of a process for producing a three layers co-extrusion biaxially polypropylene(BOPP) synthetic paper of thickness 25~250 μm which is menufactured by using three single screw extruders By means of an improvement of a process for producing a three layers co-extrusion biaxially polypropylene(hereinafter as BOPP) synthetic paper of thickness 25~250 μm. More particularly, the invention relates to a process for producing a three layers BOPP synthetic paper by means of three layers co-extrusion wherein two different PP resin compositions are separately extruded by one primary single screw extruder with venting device and two secondary single screw extruders with venting device first, and then are co-flowed by a same T-die to form a three layers coating sheet, and through cooling, biaxial orientation, corona treatment and winding to form a three layers co-extrusion synthetic paper of thickness 25~250 μm. The three layers structure of said three layers co-extrusion synthetic paper of thickness 25~250 μm can be made into three kinds, such as: paper sheet layer/foamed intermediate layer/paper sheet layer with double side paper sheet layer, paper sheet layer/foamed intermediate layer/resin layer with single side paper sheet layer and resin layer/foamed intermediate layer/resin with double side high gloss resin layer, to use as coating substrate for coating grade synthetic paper.

2 Claims, 2 Drawing Sheets

PROCESS USING SINGLE SCREW EXTRUDER FOR PRODUCING A THREE LAYER CO-EXTRUSION BIAXIALLY ORIENTED POLYPROPYLENE SYNTHETIC PAPER OF THICKNESS 25~250 μM

BACK GROUND OF THE INVENTION

1. Field of the Invention

This invention relates to an improvement of a process for producing a three layer co-extrusion biaxially polypropylene (hereinafter as BOPP) synthetic paper a thickness of from 25~250 μm. More particularly, the invention relates to a process for producing a three layer BOPP synthetic paper by means of a three layer co-extrusion process wherein two different polypropylene (PP) resin compositions are first separately extruded by one primary single screw extruder with venting device and two secondary single screw extruders with venting device and then are co-flowed by the same T-die to form a three layer coating sheet, and through cooling biaxial orientation, corona treatment and winding to form a three layer co-extrusion synthetic paper of thickness 25~250 μm. The three layer structure of said three layer co-extrusion synthetic paper of thickness 25~250 μm can be made into three kinds, such as: paper sheet layer/foamed intermediate layer/paper sheet layer with double side paper sheet layer, paper sheet layer/foamed intermediate layer/ resin layer with single side paper sheet layer and resin layer/foamed intermediate layer/resin with double side high gloss resin layer, to use as a coating substrate for coating grade synthetic paper.

2. Description of the Related Art

Nowadays the three layer co-extrusion BOPP synthetic paper differs with the polyolefin synthetic paper mainly comprising the basic substrate layer in the intermediate layer, whereon the back surface is laminated with the uniaxially oriented polypropylene (UOPP) containing inorganic fine powder as the paper surface layer(such as disclosed in the Japanese Patent Publication No. 40794/71, Japanese Laid-open Patent Publication No. 41339,81, Japanese Laid-open Patent Publication No. 118437/81 and Japanese Laid-open Patent Publication No, 87225/91, and Taiwan Patent Publication No 72218). The high strength of the paper sheet of the three layer co-extrusion BOPP synthetic paper obtained by these patent processes the problem caused by paper powder formation during printing process, and owing to the fact that the thermal dimensional stability of the paper sheet layer is good enough and cost is very low, so these synthetic papers can be sold widely sold.

However it must be improved in some aspects, such as hiding power, heat resistance, total thickness and cost of BOPP synthetic paper to replace natural pulp in wide applications. These applications can be industrialized package usage such as packaging paper, kraft paper and releasing paper etc.

Although the above mentioned patent publications have been granted, there are still some problems to make use of BOPP synthetic paper in wide applications.

However, BOPP synthetic paper can be used in various applications if the hiding power, heat resistance, total thickness of BOPP synthetic paper product could be enhanced. This, however requires improvement from the viewpoint of, for example depending on the total amount of inorganic powder added.

Upon consideration of the dispersion problem of inorganic powder used in the single screw extruder, only masterbatch ready made by dispersing the inorganic powder with resin can be used. The masterbatch mixes with the polypropylene resin in the inlet of the extruder, then enters into the extruder to melt and extrude. To obtain the dispersion of the inorganic powder in the production of the masterbatch, it is usual to use a dispersing agent such as coupling agent, calcium stearate to enhance surface treatment of the inorganic powder, to obtain much better productivity (to avoid film break in the drawing zone)and product appearance, evenness of BOPP synthetic paper. But the masterbatch containing the inorganic powder with dispersing agent incurred and moisture adsorbed may volatilize its dispersing agent and moisture into gas under high temperature kneading by the screw in the extruder. This will cause voids to be formed in the sheet during cooling after extrusion. The existing voids also form gas bubble in the product of latter zone drawing. It is necessary to control the formulation condition and processing condition.

SUMMARY OF THE INVENTION

It is a primary object of the present invention to provide an improvement of a process for producing a three layer co-extrusion biaxially polypropylene (hereinafter as BOPP) synthetic paper of thickness 25~250 μm.

It is another object of the present invention to provide a process for producing a three layer BOPP synthetic paper by means of three layer co-extrusion wherein two different PP resin compositions are separately extruded by one primary single screw extruder with a venting device and two secondary single screw extruders with a venting device first, and then are co-flowed by the same T-die to form a three layer coating sheet, and through cooling, biaxial orientation, corona treatment and winding to form a three layer co-extrusion synthetic paper of thickness 25~250 μm.

It is a further object of the present invention to provide three kinds of three layer co-extrusion synthetic paper of thickness 25~250 μm, such as: paper sheet layer/foamed intermediate layer/paper sheet layer with double side paper sheet layer, paper sheet layer/foamed intermediate layer/ resin layer with single side paper sheet layer and resin layer/foamed intermediate layer/resin with double side high gloss resin layer, to use as coating substrate for coating grade synthetic paper.

The inorganic powder may be added as needed to meet the need of the product application and quality, the applicant adopt the following two ways to reach this aim, namely to vent away the dispersing agent and moisture in the masterbatch to avoid the abnormality occurs during processing.

(1) First, each ingredients used in the extruder should be pelletized into masterbatch by pelletizer. The pelletizer adopts natural venting means to expel the remaining dispersing agent or moisture, and volatile ingredient. Then the masterbatch prepared is transferred into extruder for succeeding step.

(2) The three single screw extruders used in this process should be changed in screw structure (to make reducing zone) and install new venting device to expel the remained dispersing agent and moisture or volatilable gas. In spite of adding any amount of inorganic powder, there is no hollow void may be found in the sheet obtained after cooling.

The above described improvement ways can reach the aim of obtaining quality elevation in hiding power, heat resistance, total thickness of product and cost reduction. It is preferably to adopt the (2) means under the consideration of production cost, raw materials used and storage management.

The BOPP synthetic paper obtained by the venting process of single screw extruder which was manufactured without limitation in adding inorganic powder has much more advantages in increasing quality and cost reduction. This technical feature has not been disclosed in the prior art. The advantageous effects of this invention will be described as follows:

(1) Increasing Hiding Power

The hiding power of BOPP synthetic paper obtained by the biaxial drawing process depends on the amount of masterbatch and quantity inorganic powder. If inorganic powder can be added in large amounts, the foaming formation of product in the drawing zone is satisfactory, and hiding power from light is also good. Consequently, high hiding power can be reached without adding masterbatch or with reducing masterbatch amount used.

(2) Increasing Heat Resistance

The thermal barrier of inorganic powder is better than that of polypropylene resin, preferably used inorganic powder are calcium silicate and talc. The addition of larger amounts of inorganic powder will increase heat resistance and increase high foam formation.

(3) Increasing Total Thickness

The amount of inorganic powder added and the specific gravity of product have good correlation, and the specific gravity of product is the dominating factor of product thickness determination. If the specific gravity of product can be effectively decreased, the total thickness of product will be increased.

(4) Cost Reduction

If the amount of inorganic powder can be increased, it can reduce the cost in compounding formulation and the specific gravity of product. Consequently, the cost of synthetic paper also can be reduced.

The above described advantageous effects of the BOPP synthetic paper obtained by this invention using single screw extruders can be reached to increase the product quality and to reduce the cost, moreover the BOPP synthetic paper can be widely applied in various industrial package uses.

The BOPP synthetic paper of this invention having a three structure, which is constructed as paper sheet layer or resin layer/foamed intermediate layer/paper sheet layer or resin layer. The polypropylene (PP) resin composition used for foamed intermediate layer is extruded by a single screw primary extruder with a venting device. While the PP resin composition used for the paper sheet layer or resin layer is extruded or are extruded by two single screw secondary extruders with venting device. The above mentioned extrudates are co-flowed by the same T-die to co-extrude and form a three layer coating sheet, and through cooling, biaxial orientation, corona treatment, and winding to form a layer co-extrusion BOPP synthetic paper of double side, single side paper sheet layer and double side resin layer with high gloss.

The PP resin composition used for foamed intermediate layer is extruded by one single screw primary extruder with venting device. The PP resin composition which was composed of the polypropylene (PP) resin of 30~96% weight having high crystallinity of isotacticity above 97%, antistatic agent of 1~5% weight, calcium carbonate masterbatch 3~50% weight, and titanium oxide masterbatch 0~15% weight is uniformly blended into front side of the single screw extruder, and the volatile gas incurred in the PP resin composition can be expelled by the venting device. The PP resin composition was blended to melt toward the intermediate runner of the T-die. While the PP resin composition used for the paper sheet layer or resin layer are extruded by two single screw secondary extruders with venting devices. The PP resin composition which was composed of the polypropylene (PP) resin of 40~100% weight, polyethylene resin of 0~20% weight, antistatic agent of 0~5% weight, calcium carbonate masterbatch of 0~35% weight, titanium oxide masterbatch of 0~20% weight, antiblocking agent of 0~5% weight and ultraviolet ray absorber of 0~5% weight is fed into inlet in the front side of the two single screw secondary extruders with venting devices and uniformly blended, and the volatile gas incurred in the PP resin composition can be expelled by venting device. The PP resin composition was blended to melt toward the two outer runner of the T-die. The three extrudates extrude from the three single screw extruders were co-flowed through the same T-die in the way of three layer co-extrusion to form the coating sheet of paper sheet layer or resin layer/foamed intermediate layer/paper sheet layer or resin layer. Then, the said coating sheet was subjecting to biaxial orientation, corona treatment, winding to form a three layer co-extrusion BOPP synthetic paper of thickness 25~250 μm with double side, single side paper layer or double side resin layer with high gloss.

For the understanding of technical content of this invention, here is the detailed description of the aspects including polypropylene resin compositions, process (including extrusion, three layer co-extrusion, cooling, biaxial orientation, corona treatment, winding)as follows.

PP resin used in this invention which having high crystallinity as the essential ingredient to be suitable not only for cultural paper, but also for industrial package paper. The PP resin used in this invention are homopolymer with high crystallinity of melt flow index 0.5~12 (230° C./2.16 kg, ASTM DI238) and most of them are isotactic. Different MFI and molecular weight distribution of PP resin can be chosen to match the drawing ratio in controlling the mechanical strength and thickness evenness. To attain the imitation paper effect of different gloss by using paper sheet layer, it is preferable to choose PE (polyethylene) of MFI 0.1~14.

The inorganic powder used in this invention mainly plays the function for significantly decreasing the specific gravity, elevating the hiding power, heat resistance and total thickness, and thus provides the paper sheet layer with excellent pen-writing and printability that is superior to conventional synthetic paper. The inorganic powder can be one or more than two selected from the group of calcium carbonate, diatomite, kaolin clay, calcium oxide, barium sulfate and titanium oxide, and the particle size of inorganic powder ranges from 0.1 to 10 μm, the amount used depends on the physical properties required. The inorganic powder used in this invention should be made into masterbatch before processing, kind and concentration of dispersing agent used in the masterbatch also depends on the kind of inorganic powder and product application. Titanium oxide masterbatch also can be used to provide the function for adjusting the opaqueness, whiteness of synthetic paper and enhancing the effect of ultraviolet resistance, this also depends on product application.

The antistatic agent used in this invention could be the same as those used in the BOPP, in which tertiary amine, amide preferably used can eliminate the static effect caused in the coating process.

In order to prevent the mutual adhesion between the coating layers from ocurring while coating and winding process, the antiblocking agent is required, and generally it may be such as silica, clay, polymethyl methacrylate (PMMA), and glass bead.

The specific gravity of BOPP synthetic paper obtained by this invention falls into the range of 0.5~0.89, this can be adjusted in formulation of PP composition according to the product application and cost. It is intended to let the consumer to use wider coverage in the same unit weight of product.

Three layer structure of the BOPP synthetic paper obtained by this invention is paper sheet layer or resin layer/foamed intermediate layer/paper sheet layer or resin layer as described above, the physical properties, productivity depend on the formulation, equipment, operation condition required. Be able to add large amount of inorganic powder to enhance the production of BOPP synthetic paper is the characteristic feature of this invention, and this has not been reached by prior art, especially in biaxial orientation drawing process. BOPP synthetic paper of thickness 25~250

μm in single, double side matted paper sheet layer and two side high gloss paper sheet layer can be obtained by the process shown in the accompanying drawing. The device, steps used can be described as follows.

To achieve the above objects, and novel features of the invention will become more apparent from the following detailed description when taken in conjunction with the accompanying drawings.

BRIEF DESCRIPTION OF THE DRAWINGS

FIG. 1 shows a cross section view showing three kinds of three layer coextrusion BOPP synthetic paper according to this invention by using a single screw extruder for producing a three layer coextrusion BOPP synthetic paper of thickness 25~250 μm.

Figure 1A:
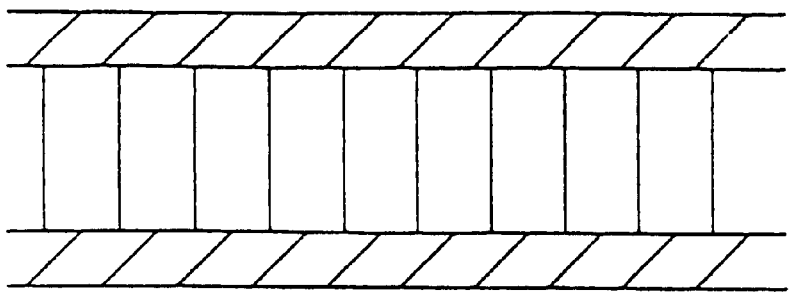
FIG. 1a shows BOPP synthetic paper structure of paper sheet layer/foamed intermediate layer/paper sheet layer with double side paper sheet layer.
Figure 1B:
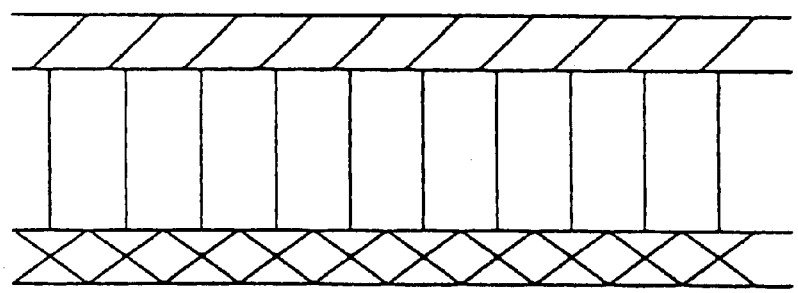
FIG. 1b shows BOPP synthetic paper structure of paper sheet layer/foamed intermediate layer/resin layer with single side paper sheet layer.
Figure 1C:
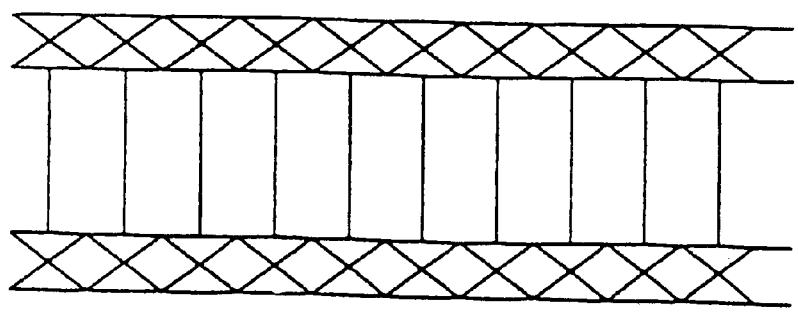
FIG. 1c shows BOPP synthetic paper structure of resin layer/foamed intermediate layer/resin layer with double side high gloss resin layer.
Figure 2:
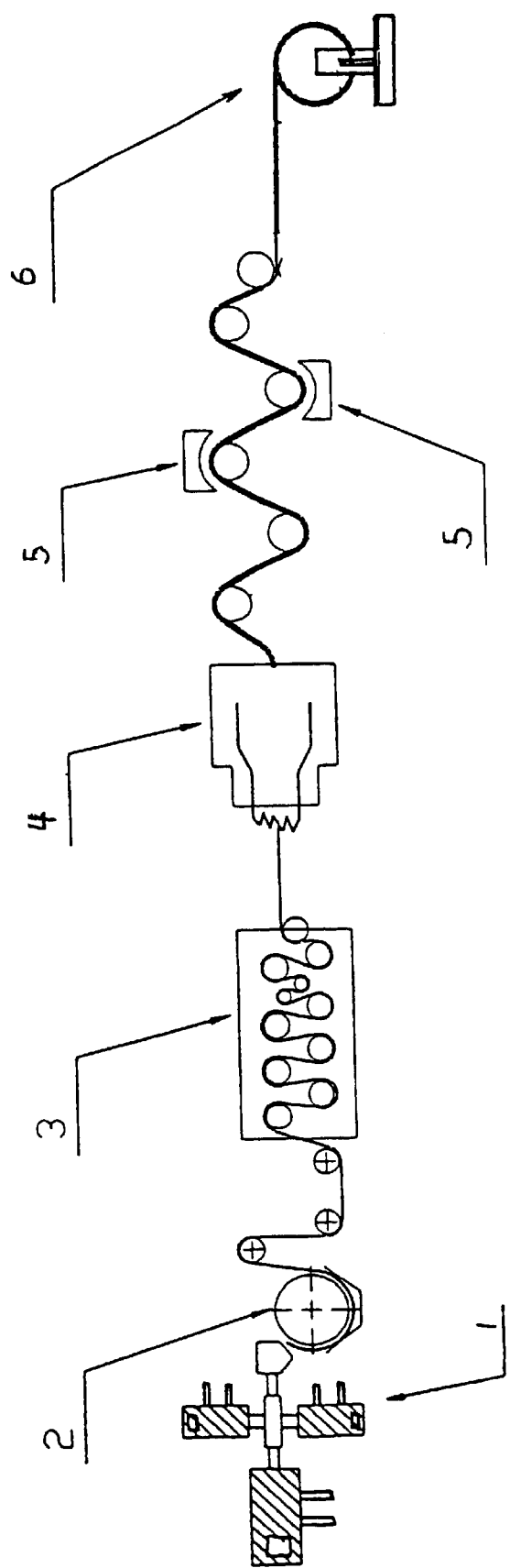
FIG. 2 shows the processing device of this invention, wherein numeral 1 indicates extruder; 2 indicates cooling and shaping roller; 3 indicates longitudinal orientation; 4 indicates lateral orientation device; 5 indicates corona treatment device; 6 indicates winding device.

The device in pursuance of the process of this invention are further described as follows:
1. Extruder:

The extruder comprises one single screw primary extruder with venting device and two single screw secondary extruders with venting device whose temperature conditions vary with the ingredients of the resin composition, MFI (melt flow index), crystallinity, viscosity, additive and production line speed (winding speed) that normally set in the range between 180~280, and the vacuum degree is always set in the range of 0~760 mmHg.

Cooling and Shaping Roller:

The roller adopts the water cooling device to cool and form the three layer coextrudate of high temperature between 180° C.~280. The control of cooling temperature in the step is quite important, which dominates the success of the following steps. The cooling temperature is normally set at 15~65° C. being adjustable depending on the thickness of synthetic paper and the speed of production line.

3. Longitudinal Orientation Device:

The cooled and formed sheet is fed in this device for preheating to soften the paper sheet at 115~150° C. (depending on the thickness of paper sheet and the speed of production line), and then be oriented in two steps with low and high speed so as to enhance the longitudinal mechanical strength of coating layer which being then tempered and formed. In general, the longitudinal draw ratio is set at 36 times.

Lateral Orientation Device:

The thinner paper sheet formed through the foregoing longitudinal orientation treatment is preheated and softened at 140~195° C. (depending on the thickness of paper sheet and speed of production line)and then laterally oriented and finally tempered and formed so as to partially reduce the dimension of coating layer for its stability. Generally, the lateral drawing ratio is set at 5~12 times depending on the product requirement.

Corona Treatment Device:

This treatment is to improve the surface characteristics of BOPP synthetic paper suitable for various applications, such as printing, coating, sizing and laminating. For one side or two side corona treatment, a high frequency discharging device with power of 20~120 KW is used (depends on the speed of production line)so as to obtain a surface wetting tension of 36~48 dyne/cm.

Winding Device:

The coating layer of this invention is taken up to be a end product with 8 meters in width by a tubular device, and then can be striped into thickness of 25~25 μm rolled or sheeted product.

The thickness proportion in the three layers BOPP synthetic paper obtained by this invention can be shown as follows:

| Layer Thickness of product | Thickness of each layer | | | | | |
| --- | --- | --- | --- | --- | --- | --- |
| | 25 μm | 26 μm~50 μm | 51 μm~100 μm | 101 μm~150 μm | 151 μm~200 μm | 201 μm~250 μm |
| Paper sheet layer or resin layer | 1~3 μm | 1~10 μm | 1~20 μm | 2~30 μm | 5~30 μm | 10~30μm |
| Foamed intermediate layer | 23~19 μm | 23~30 μm | 49~60 μm | 97~90 μm | 140~146 μm | 181~190 μm |
| Paper sheet layer or resin layer | 1~3 μm | 1~10 μm | 1~20 μm | 2~30 μm | 5~30 μm | 10~30 μm |

The thickness of paper sheet layer and resin layer can be fallen into the range of 1~30 μm, this can be adjusted as product requirement.

DETAILED DESCRIPTION OF THE PREFERRED EMBODIMENT

In order to understand the technical feature of this invention, various characteristics and applications of three layer BOPP synthetic paper made form PP resin compositions is shown as embodiment examples. Some embodiment examples will be illustrated in more details by reference. This includes the production of writing, printing, packaging and various applications of BOPP synthetic paper. However, these examples cannot be explained as limitations of the scope of this invention.

EMBODIMENT EXAMPLE 1

BOPP synthetic paper with single side paper sheet layer of thickness below 250 μm (samples 1,2,3 enclosed) PP resin (MFI=2.0)of 69% weight, antistatic agent of 3% weight, calcium carbonate masterbatch of 20% weight, and titanium oxide masterbatch of 8% weight are mixed and fed into the inlet of the single screw primary extruder with venting device. On the other way, PP resin (MFI=2.4) of 60% weight, PE(Polyethylene) resin(MFI=1) of 11% weight, antistatic agent of 2% weight, antiblocking agent of 1% weight, titanium oxide masterbatch of 5% weight, calcium carbonate masterbatch of 20% weight, and ultraviolet absorbent of 1% weight are mixed by a mixer and fed into the inlet of No. 1 single screw secondary extruder with venting device to knead and vent, in the meanwhile, PP resin (MFI=2.4) of 97% weight, antistatic agent of 3% weight are mixed and fed into the inlet of No. 2 single screw secondary extruder with venting device to knead. At the extruder temperature of 200~280° C., these mixtures are extruded through the same one T-die by means of three layers coextrusion. At the temperature of cooling rollers set at 15~60° C., the PP coating sheet is cooled and shaped, then preheated at 120~150° C. and fed into the lateral orientation device for drawing 5 times in lateral orientation, then tempered and cooled, preheated to enter into a longitudinal orientation device whose temperature set at 150~185° C. for drawing 9 times in longitudinal orientation, then tempered and cooled to control the good printability, coating and lamination of the thus obtained three layers synthetic paper, and taken up by winding device BOPP synthetic paper with single side sheet layer of thickness below 250 μm can be manufactured by the above method, and used in various applications to instead kraft paper, art paper or releasing paper with PE film casted for coating substrate, furthermore it can be widely applied in printing, pen writing, and packaging application. The physical properties of BOPP synthetic paper with single side sheet layer in three different thickness of 80 μm (see attached sample 1), 100 μm (see attached sample 2), 120 μm (see attached sample 3) made by this embodiment example are shown as following table.

| Item | Unit | Thickness | | | Test method |
|---|---|---|---|---|---|
| | | 80 μm | 100 μm | 150 μm | |
| Specific gravity | — | 0.70 | 0.70 | 0.64 | ASTM D 1238 |
| Basic weight | g/cm² | 56.0 | 70.0 | 96 | JIS P 8124 |
| Gloss | % | 20/119 | 20/119 | 21/118 | TAPPI T 480 |
| Whiteness | % | 97 | 97 | 97 | TAPPI T 525 |
| Opaqueness | % | 85 | 92 | 96 | TAPPI T 425 |
| Roughness | μ | 0.70 | 0.70 | 0.70 | TAPPI T 555 |
| Surface resistivity | Ω | $10^{12}$ | $10^{12}$ | $10^{12}$ | ASTM D 257 |

EMBODIMENT EXAMPLE 2

BOPP synthetic paper with double side high gloss paper sheet layer of thickness 70 μm, manufactured by adding large amount of inorganic powder PP resin (MFI=1.6) of 52% weight, antistatic agent of 3% weight, and calcium carbonate masterbatch of 45% weight are mixed and fed into the inlet of the single screw primary extruder with venting device. On the other way, PP resin (MFI=2.4) of 94% Weight, antistatic agent of 2% weight, antiblocking agent of 1% weight and ultraviolet absorbent of 2% weight are mixed by a mixer and fed into the inlet of No. 1, No. 2 single screw secondary extruder with venting device to knead and vent. In the meanwhile, at the extruder temperature of 200~280° C., and vacuum degree to 700 mmHg, these mixtures are extruded through the same one T-die by means of three layer coextrusion. At the temperature of cooling rollers set at 15~60° C., the PP coating sheet is cooled and shaped, then preheated at 120~150 ° C. and fed into the lateral orientation device for drawing 5.5 times in lateral orientation, then tempered and cooled, preheated to enter into a longitudinal orientation device whose temperature set at 150~185° C. for drawing 9 times in longitudinal orientation, then tempered and cooled to control the good printability, coating and lamination of the thus obtained three layers synthetic paper, and taken up by winding device. The specific gravity of BOPP synthetic paper with double side sheet layer of thickness 70 μm manufactured by the above method is extremely low, can be used to substitute package application of reinforced kraft paper bag, which is laminated with PE or PP woven bag in both side by casting PE layer thereon. The above mentioned reinforced kraft paper bag is usually used for the packaging of raw material., fertilizer and cement. The physical properties of BOPP synthetic paper with double side high gloss paper sheet layer of thickness 70 μm (see attached sample 4) made by this embodiment example are shown as following table.

| Item | Unit | Thickness | Test method |
|---|---|---|---|
| | | 70 μm | |
| Specific gravity | — | 0.55 | ASTM D 1238 |
| Basic weight | g/cm² | 38.5 | JIS P 8124 |
| Gloss | % | 109/104 | TAPPI T 480 |
| Whiteness | % | 86 | TAPPI T 525 |
| Opaqueness | % | 85 | TAPPI T 425 |
| Roughness | μ | 0.6 | TAPPI T 555 |
| Surface resistivity | Ω | $10^{11}$ | ASTM D 257 |

EMBODIMENT EXAMPLE 3

BOPP synthetic paper with double side matted paper sheet layer of thickness 120 μm, manufactured by adding large amount of inorganic powder.

PP resin (MFI=1.6) of 52% weight, antistatic agent of 3% weight, and calcium carbonate masterbatch of 45% weight are mixed and fed into the inlet of the single screw primary extruder with venting device. On the other way, PP resin (MFI=2.4) of 60% weight, antistatic agent of 2% weight, PE resin of 11% weight, calcium carbonate masterbatch of 20% weight, and titanium oxide masterbatch of 7% weight, are mixed by a mixer and fed into the inlet of No. 1, No. 2 single screw secondary extruder with venting device to knead and vent. In the meanwhile, at the extruder temperature of 200~280° C., and vacuum degree to 750 mm Hg, these mixtures are extruded through the same one T-die by means of three layer coextrusion. At the temperature of cooling rollers set at 15~60° C., the PP coating sheet is cooled and shaped, then preheated at 120~150° C. and fed into the lateral orientation device for drawing 4.5 times in lateral orientation, then tempered and cooled, preheated to enter into a longitudinal orientation device whose temperature set at 150~190° C. for drawing 9 times in longitudinal orientation, then tempered and cooled to control the good printability, coating and lamination of the thus obtained three layers synthetic paper, and taken up by winding device. The specific gravity of BOPP synthetic paper with double side matted paper sheet layer of thickness 70 μm manufactured by the above method is extremely low, can be used for printing name card and front cover of book. The physical properties of BOPP synthetic paper with double side matted paper sheet layer of thickness 120 μm (see attached sample 5) made by this embodiment example are shown as following table.

| | | Thickness | |
|---|---|---|---|
| Item | Unit | 120 μm | Test method |
| Specific gravity | — | 0.55 | ASTM D 1238 |
| Basic weight | g/cm$^2$ | 66.0 | JIS P 8124 |
| Gloss | % | 21/24 | TAPPI T 480 |
| Whiteness | % | 97 | TAPPI T 525 |
| Opaqueness | % | 94 | TAPPI T 425 |
| Roughness | μ | 0.85 | TAPPI T 555 |
| Surface resistivity | Ω | 10$^{12}$ | ASTM D 257 |

Although the invention has been explained in relation to its preferred embodiment, it is to be understood that many other possible modifications and variations can be made without departing from the spirit and scope of the invention as hereinafter claimed.

What is claimed is:

1. A process for manufacturing a 3-layer co-extruded biaxial-oriented polypropylene (BOPP) synthetic paper of thickness 25–250 μm by using single-screw extruders comprising:

(a) uniformly blending a first resin composition comprising 30%–96% by weight of a high crystallinity polypropylene having over 97% isotacticity and a melt flow index of 0.5–12, 1–5% by weight of antistatic agent, 3–50% by weight of calcium carbonate masterbatch, and 0–15% by weight of titanium oxide masterbatch into an inlet in the front side of a single-screw primary extruder with a venting device;

(b) uniformly blending a second resin composition comprising 40%–100% by weight of polypropylene, 0–20% by weight of polyethylene (PE), 0–35% by weight of calcium carbonate masterbatch, 0–20% by weight of titanium oxide masterbatch, 0–5% by weight of antiblocking agent and ultraviolet light absorber into an inlet in the front side of a first single-screw secondary extruder with venting device;

(c) uniformly blending a third resin composition comprising 40%–100% by weight of polypropylene, 0–20% by weight of polyethylene (PE), 0–35% by weight of calcium carbonate masterbatch, 0–20% by weight of titanium oxide masterbatch, 0–5% by weight of antiblocking agent and ultraviolet light absorber into an inlet in the front side of a second single-screw secondary extruder with venting device;

(d) conveying said first, second and third resin compositions through said single-screw primary extruder said first single-screw secondary extruder and second single-screw secondary extruder respectively to a T-die and co-extruding said first, second and third resin compositions through said T-die at an extrusion temperature of 180° C. to 280° C. and vacuum degree of 0–750 mmHg to form a three layer polypropylene synthetic paper having a paper sheet layer or resin layer formed from said second resin composition, a foamed intermediate layer formed from said first resin composition and a paper sheet layer or resin layer formed from said third resin composition;

(e) cooling and shaping said three layer polypropylene synthetic paper by contacting said paper with a cooling roller having a temperature of 15° C. to 60° C. to form a cooled and shaped three layer polypropylene synthetic paper;

(f) orienting said cooled and shaped three layer polypropylene synthetic paper longitudinally 3–6 times in a preheated longitudinal orientation device; said preheated longitudinal orientation device being preheated 115–150° C.; and then tempering and cooling said film;

(g) orienting said cooled and shaped three layer polypropylene synthetic paper laterally 5–12 times in a preheated lateral orientation device; said preheated lateral orientation device being preheated 140–195° C.; and then tempering and cooling said synthetic paper, whereby said longitudinal and lateral orientation of said synthetic paper produces a biaxially oriented polypropylene synthetic paper;

(h) treating said biaxially oriented polypropylene synthetic paper to a corona discharge treatment with a high frequency wave under a power of 20–120KW;

(i) taking up said biaxially oriented polypropylene synthetic paper by a winding device to form a roll of 3-layer co-extruded biaxial-oriented polypropylene (BOPP) synthetic paper of thickness 25~250 μm by using single-screw extruders.

2. The method of claim 1, wherein each ingredient in the extruder is pelletized into a masterbatch by a pelletizer.

* * * * *